United States Patent [19]
Abe et al.

[11] Patent Number: 5,934,086
[45] Date of Patent: Aug. 10, 1999

[54] ABSORPTION REFRIGERATOR

[75] Inventors: Tadao Abe, Ashikaga; Yasuo Takase, Aso-gun, both of Japan

[73] Assignee: Sanyo Electric Co., Ltd., Moriguchi City, Osaka, Japan

[21] Appl. No.: 08/962,592

[22] Filed: Oct. 31, 1997

[30] Foreign Application Priority Data

Nov. 29, 1996 [JP] Japan ................................. 8-319379

[51] Int. Cl.⁶ ............................. F25B 15/00; F25B 39/02
[52] U.S. Cl. .................................. 62/108; 62/476; 62/515
[58] Field of Search ............................. 62/101, 476, 487, 62/488, 108, 515, 527

[56] References Cited

U.S. PATENT DOCUMENTS

| | | | |
|---|---|---|---|
| 2,295,088 | 9/1942 | Kleucker | 62/527 |
| 2,833,125 | 5/1958 | Sturley | 62/527 |
| 4,133,184 | 1/1979 | Bivins | 62/49 |
| 4,938,028 | 7/1990 | Murray | 62/108 |
| 5,542,267 | 8/1996 | Lee et al. | 62/485 |

*Primary Examiner*—William Doerrler
*Attorney, Agent, or Firm*—Wenderoth, Lind & Ponack, LLP

[57] ABSTRACT

An absorption refrigerator includes a generator for separating, by vaporization, a refrigerant from an absorption solution, a condenser for liquefying by condensation the vaporized refrigerant, an evaporator for vaporizing the liquefied refrigerant from the condenser by heat exchange with a heat medium, and an absorber for absorbing the vaporized refrigerant to react against the absorption solution to be supplied from the generator. The evaporator has heat exchanger pipes disposed in the vertical direction and refrigerant discharge nozzles for discharging the refrigerant toward the inner walls of the heat exchanger pipes. Each of the refrigerant discharge nozzles is arranged at a position displaced downward by a predetermined distance from the upper end of each of the heat exchanger pipes.

18 Claims, 6 Drawing Sheets

ABSORPTION REFRIGERATOR

BACKGROUND OF THE INVENTION

The present invention relates to an absorption refrigerator for use with an air conditioner, a water heater, etc.

Figure 7:
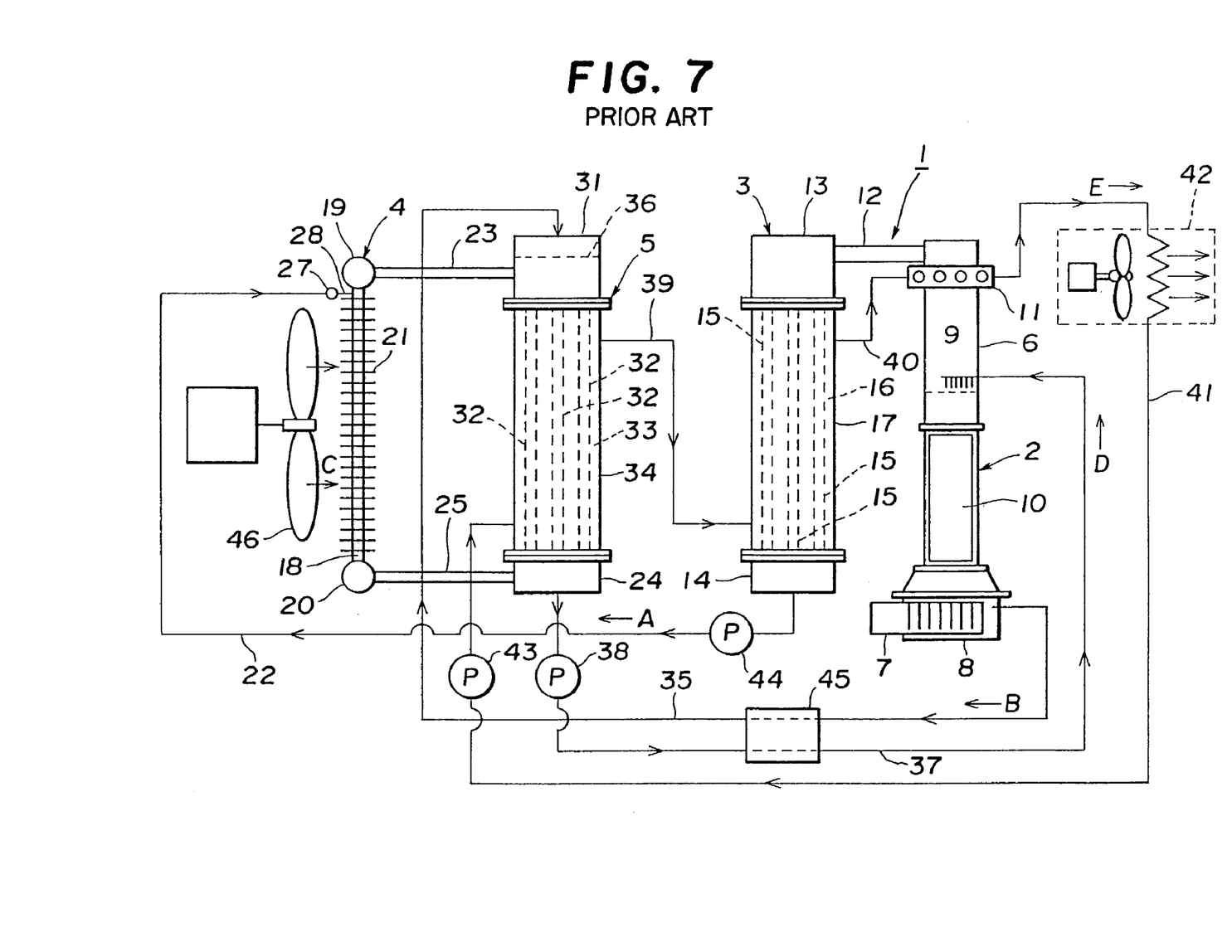
FIG. 7 is a system block diagram of a previous absorption refrigerator.

This type of absorption refrigerator is disclosed in Japanese Patent Application No. 7-292,756/1985. The structure of this absorption refrigerator is as shown in FIG. 7 wherein reference numeral 1 designates the absorption refrigerator as proposed. This absorption refrigerator 1 comprises a generator 2 which has a regeneration function for heating a diluted absorption solution B which has absorbed a heat exchanger refrigerant A and separates the refrigerant A from the absorption solution B by vaporization, and a function for separating absorption solution from vaporized refrigerant. Further, the absorption refrigerator 1 comprises a condenser 3 for liquefying the separated vaporized refrigerant A through condensation, an evaporator 4 into which the liquefied refrigerant A discharged from the condenser 3 is supplied and which is adapted to vaporize the liquefied refrigerant A by depriving a heat medium C such as the outside air and the like contacting the outer surface thereof of its latent heat of vaporization and an absorber 5 for allowing the vaporized refrigerant A to be absorbed in absorption solution B by causing the vaporized refrigerant A from the evaporator to react against the absorption solution B which has been condensed after the refrigerant A was vaporized and supplied from the generator 2 and for circulating the absorption solution B, which has absorbed the refrigerant A, through the generator 2.

The generator 2 is provided with a cylindrical rectifying tower 6, a regenerator 8 directly connected to the lower part of a rectifying tower 6 and provided with a burner 7 as a heating portion for heating the absorption solution B which has absorbed the refrigerant A (the absorption solution B that has absorbed the refrigerant A is hereinafter called a diluted absorption solution D), a diluted absorption solution spraying nozzle 9 provided substantially at the central portion of the rectifying tower 6 and adapted to spray the diluted absorption solution D into the rectifying tower 6, a filler material 10 such as a non-woven fabric disposed above the regenerator 8, and an auxiliary condenser 11 arranged near the upper end of the filler material 10 within the rectifying tower 6 and adapted to cool and condense the refrigerant A when the refrigerant A, which has been vaporized to become separated from the diluted absorption solution D by being heated by the burner 7, has reached the upper portion of the rectifying tower 6.

The condenser 3 is arranged substantially parallel to the rectifying tower 6 and comprises a storage box 13 held in communication with the downstream side end of the auxiliary condenser 11 through a duct 12, a refrigerant tank 14 arranged below the storage box 13 in spaced apart relationship with the latter, a plurality of communication pipes 15 for establishing communication between the storage box 13 and the refrigerant tank 14, an outer sheath 17 provided to surround the communication pipes 15 and to form a cooling water path 16 between the storage box 13 and the refrigerant tank 14.

The condenser 3 guides the refrigerant A flowing into the storage box 13 via the auxiliary condenser 11 to the refrigerant tank 14 through the communication pipes 15 and, during its passage through the pipes 15, the refrigerant A is condensed and liquefied by cooling water E (to be described later) flowing in the cooling water path 16 between the communication pipes 15.

The evaporator 4 comprises a plurality of heat exchanger pipes 18 disposed along the vertical direction, an upper header 19 for connecting the upper ends of the heat exchanger pipes 18 so as to establish communication therebetween, a lower header 20 for connecting the lower ends of the heat exchanger pipes 18 so as to establish communication therebetween and a number of heat exchanger fins 21 arranged along the longitudinal direction of the heat exchanger pipes 18 in spaced apart relationships with one another and to which the heat exchanger pipes 18 are fixed, keeping communication therebetween. Further, each of the upper ends of the heat exchanger pipes 18 is held in communication with the refrigerant tank 14 through a refrigerant supply pipe 22, the upper header 19 is held in communication with the upper end of the absorber 5 through a communication pipe 23 and the lower header 20 is held in communication with the diluted absorption solution tank 24 provided at the lower end of the absorber 5 through a communication pipe 25. Further, between the downstream side end of the refrigerant supply pipe 22 and the upper end of each of the heat exchanger pipes 18 of the evaporator 4, there is provided a refrigerant dripping means 26 for distributing the liquefied refrigerant A from the refrigerant supply pipe 22 to the heat exchanger pipes 18 so as to allow the refrigerant A to drip along the inner surfaces of the heat exchanger pipes 18.

Figure 8:
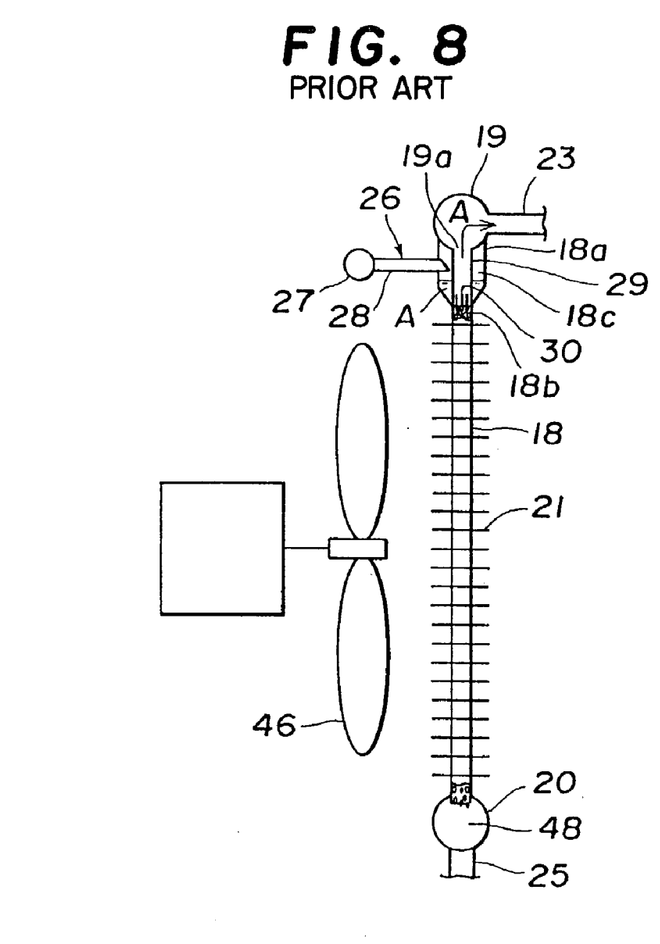
FIG. 8 is a schematic block diagram of an evaporator of such previous absorption refrigerator.
Figure 9:
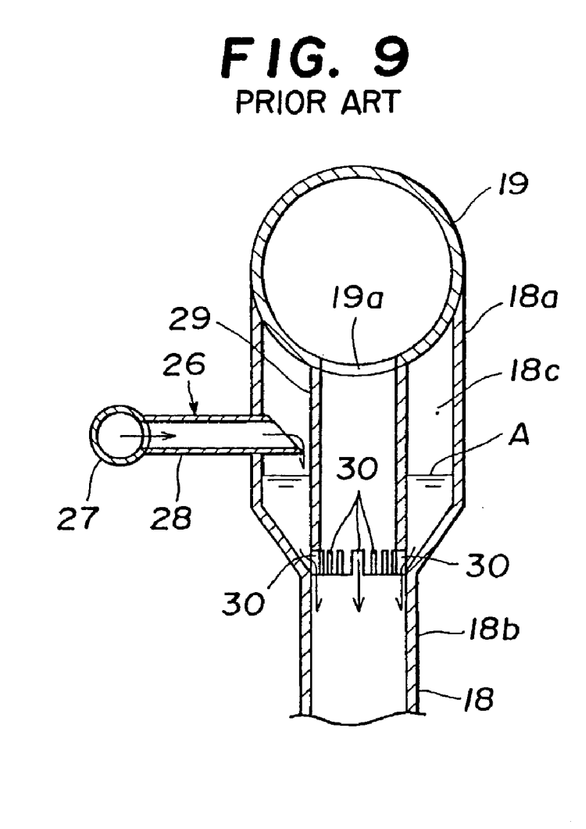
FIG. 9 is a detailed diagram of a refrigerant discharge portion of the evaporator of such previous absorption refrigerator.

As shown in FIGS. 8 and 9, the refrigerant dripping means 26 comprises a refrigerant supply header 27 arranged along the upper end of the heat exchanger pipes 18, a refrigerant supply nozzle 28 provided on the refrigerant supply header 27 in spaced apart relationship with the latter so as to project into the interior of the heat exchanger pipe 18 and a guide member 29 provided within the upper end of the heat exchanger pipe 18 and adapted to drop the liquefied refrigerant A from the refrigerant supply nozzle 28 along the inner wall surface of the heat exchanger pipe 18.

Described in more detail, the upper end of the heat exchanger pipe 18 has, as shown in FIG. 9, a large-diameter portion 18a and the upper header 19 is connected airtight to the large-diameter portion 18a so as to cover an open end of portion 18a. Further, at the position of the upper header 19 that is opposed to a small-diameter portion 18b of the heat exchanger pipe 18, there is formed a through hole 19a which establishes communication between the heat exchanger pipe 18 and the upper header 19 and annular guide member 29 of substantially the same diameter as the through hole 19a is mounted so as to establish communication between the through hole 19a and the small diameter portion 18b of the heat exchanger pipe 18.

The guide member 29 has the upper end thereof connected airtight to the upper header 19 while the lower end thereof is fitted in the small-diameter portion 18b of the heat exchanger pipe 18 so that by the existence of the large-diameter portion 18a of the heat exchanger pipe 18, there is formed a stay portion 18c for the liquefied refrigerant A between the guide member 29 and the upper header 19 and within this stay portion 18c, the top end of the supply nozzle 28 passing through the side wall of the large-diameter portion 18a of the heat exchanger pipe 18 is positioned.

Further, at the lower end of the guide member 29 there are formed a number of guide grooves 30 along the direction of axis of the guide member so as to open toward the lower end surface of the guide member and to extend to a predetermined depth from that lower end surface, and through such guide grooves 30, the above-mentioned stay portion 18c is held in communication with the interior of the heat exchanger pipe 18.

The absorber 5 comprises an absorption solution dripping means 31 to which there is connected the communication pipe 23 which is connected to the upper header 19 of the evaporator, the diluted absorption solution tank 24 arranged below the absorption solution dripping means in spaced apart relationship with the latter and in which the absorption solution B (i.e., the diluted absorption solution D) which has absorbed the refrigerant as a result of its reaction against the vaporized refrigerant A is stored, a plurality of communication pipes 32 for establishing communication between the absorption solution dripping means 31 and the diluted absorption solution tank 24 and an outer sheath 34 provided to surround the communication pipes 32 so as to form a cooling water path 33 between the absorption solution dripping means and the diluted absorption solution tank 24 and adapted to absorb the refrigerant A vaporized in heat exchanger pipes 18 by reducing the internal pressure thereof.

Further, the absorption solution dripping means 31 has its upper portion connected to an absorption solution supply pipe 35 for supplying absorption solution B condensed by the regenerator 8 and is provided therein with a dispersion plate 36 disposed to divide the inner space thereof vertically into two portions. Further, the above-mentioned communication pipe 23 is connected to dripping means 31 at a position below the dispersion plate 36 and through this communication pipe 23 the refrigerant A vaporized by the evaporator 4 is supplied.

The diluted absorption solution tank 24 is held in communication with the diluted absorption solution spray nozzle 9 through a diluted absorption solution return pipe 37 and at the intermediate portion of the return pipe 37 there is provided a diluted absorption solution circulation pump 38 for supplying the diluted absorption solution stored in the diluted absorption solution tank 24 to the diluted absorption solution spray nozzle 9.

Between the upper end of the outer sheath 34 of the absorber 5 and the lower end of the outer sheath 17 of the condenser 3 there is provided a communication pipe 39 to thereby establish communication therebetween, and between the upper end of the outer sheath 17 and the auxiliary condenser 11 there is provided a communication pipe 40 to thereby establish communication therebetween. Further, between the auxiliary condenser 11 and the lower end of the outer sheath 34 there is provided a communication pipe 41 to thereby establish communication therebetween and a closed circuit for the circulation of cooling water is formed by the outer sheath 34, the communication pipe 39, the outer sheath 17, the connecting pipe 40, the auxiliary condenser 11 and the communication pipe 41. At the intermediate portion of the communication pipe 41, there are provided an air conditioner room unit 42 and a cooling water circulation pump 43 for circulating the cooling water E.

In FIG. 7, reference numeral 44 designates a refrigerant circulation pump provided midway in the refrigerant supply pipe 22 so as to supply the liquefied refrigerant A, reference numeral 45 designates a heat exchanger into which the absorption solution supply pipe 35 and the diluted absorption solution return pipe 37 are inserted so as to exchange heat between the two pipes and supplying C to the reference numeral 46 designates an air blower for supplying the outside air as an outside heat medium C to the evaporator 4.

In the case of the absorption refrigerator 1 of the above-described structure, the liquefied refrigerant A supplied from the refrigerant tank 14 by means of the refrigerant circulation pump 44 is supplied to the refrigerant dripping means 26 provided above the evaporator 4.

In the refrigerant dripping means 26, the liquefied refrigerant A is distributed to the stay portion 18c through the refrigerant supply header 27 and each of the refrigerant supply nozzles 28. Then, the liquefied refrigerant A supplied to the stay portion 18c is dripped to flow down along the inner wall surface of each heat exchanger pipe 18 and by the contact of the outside air as the heat medium C with the surfaces of the heat exchanger fins 21 and the heat exchanger pipe 18, a heat exchange operation is performed between the open air C and the liquefied refrigerant A flowing downward along the inner wall surfaces of the heat exchanger pipes 18, so that the liquefied refrigerant A vaporizes by depriving the outside air C of its latent heat of vaporization, moves upward within the heat exchanger pipes 18 and after being collected by the upper header 19 at the upper end of the heat exchanger pipes 18, it is supplied to the absorber 5.

The vaporized refrigerant A supplied to the absorber 5 is, brought into contact with the absorption solution B from the regenerator 8 so that it is absorbed into the absorption. solution B to become the diluted absorption solution D. Further, the diluted absorption solution D is supplied to the diluted absorption solution spray nozzle 9 through the diluted. absorption circulation pump 38 so as to be sprayed into the rectifying tower 6, heated by the burner 7 under the rectifying tower 6 and with the vaporization of the refrigerant A, the diluted absorption solution D is separated into the absorption solution B and the refrigerant A.

Thus, the refrigerant A exchanges heat with the cooling water E during its passage through the auxiliary condenser 11 and the condenser 3 and further, during its passage through the absorber 5, the heat it has absorbed from the outside air is given to the cooling water E.

Accordingly, the cooling water E is gradually heated while it is circulated through the absorber 5, the condenser 3 and the auxiliary condenser 11 and then supplied to the ,air conditioner room unit 42 for heating.

In the case of the absorption refrigerator 1, it is possible to increase the amount of heat radiation from the room unit 42 by more than 1.3 times the amount of heat generated from the burner 7 by help heating the cooling water E through the absorption of the heat energy of the outside air C.

PROBLEMS SOUGHT TO BE SOLVED BY THE INVENTION

In the case of the absorber 5, the vaporized refrigerant A within the heat exchanger pipes 18 is sucked from the upper end of the pipes 18 into the absorber 5 by reducing the internal pressure of the absorber 5 and since the pressure within the heat exchanger pipes 18 tends to increase due to vaporization of the refrigerant A, an air current directed to the absorber 5 from the lower end thereof via the upper end thereof is generated within the heat exchanger pipes 18.

The evaporator 4 is so constructed that the liquefied refrigerant A is dripped down along the inner wall surfaces of the heat exchanger pipes 18 from the upper end thereof but when the amount of vaporization of the refrigerant A is large, it is supposed that since the pressure in the heat exchanger pipes 18 increases gradually and the velocity of the air current is accelerated, the refrigerant A dripped on the upper ends of the heat exchanger pipes 18 will be supplied to the absorber 5 by the air current before vaporization of the refrigerant resulting in reducing the heat absorption efficiency of the refrigerant in the evaporator 4.

In addition, due to the arrangement in which the refrigerant A is dripped through the guide grooves 30 formed below the stay portion 18c after it is once stored in the stay portion 18c, the amount of dripping is liable to be affected by the variation of pressure within the heat exchanger pipe 18 and there is sometimes a case in which the amount of dripping of the refrigerant A scatters to a great degree.

SUMMARY OF THE INVENTION

The present invention has been made in view of the problems involved in the above-described proposal.

A first object of the present invention is to provide an absorption refrigerator which can increase the rate of vaporization of a refrigerant discharged into the heat exchanger pipes of the absorption refrigerator.

A second object of the present invention is to provide an absorption refrigerator which can control as much as possible the amount of discharge of the refrigerant.

Now, in the case of the absorption refrigerator shown in FIG. 7, dew condensation takes place on the surfaces of the heat exchanger fins 21 of the evaporator 4 and waterdrops sometimes adhere to the surfaces of the fins 21 and in the case of the evaporator 4 of the above-described absorption refrigerator 1, there is the problem that the above-mentioned waterdrops stay on the surfaces of the heat exchanger fins 21.

Thus, if the waterdrops have stayed on the surfaces of the heat transfer fins 21, the transfer of heat at the portion where the waterdrops are hindered so that the heat exchange efficiency of the evaporator 4 lowers resulting in affecting the heat exchange efficiency of the absorption refrigerator.

Further, if the waterdrops have stayed on the surfaces of the heat exchanger fins 21 due to the cooling of the heat exchanger fins 21 by vaporization of the low temperature refrigerant, the waterdrops sometimes freeze and the adhesion of the waterdrops to the heat exchanger fins 21 is further accelerated by this freezing so that not only it becomes difficult to remove them but also the frozen portion develops to narrow the flow path of the heat medium generated among the heat exchanger fins 21 resulting in increasing the flow path resistance which further lowers the heat exchange efficiency between the outside air C and the heat exchanger fins 21.

In addition, there is also the problem that the flow of the outside air C becomes parallel to the heat exchanger fins 21 and the flow of the outside air among the heat exchanger fins 21 becomes a lamination flow so that a thin laminar flow boundary layer is formed on the surfaces of the fins 21 whereby the amount of heat transfer between the outside air and the heat exchanger fins 21 is reduced.

Accordingly, still another object of the present invention is to prevent the lowering of the heat exchange efficiency between the heat exchanger fins of the evaporator and the heat medium.

In order to achieve the above-described first object of the present invention, an absorption refrigerator according to a first of the invention comprises a generator provided with a heating portion for heating an absorption solution which has absorbed a heat exchanging refrigerant and separating the refrigerant by vaporization from the absorption solution, a condenser for condensing and liquefying the separated vaporized refrigerant, an evaporator into which the liquefied refrigerant from the condenser is supplied and which is adapted to vaporize the refrigerant by heat exchange with a heat medium brought into contact with the outer surface thereof and an absorber for allowing the refrigerant to be absorbed in the by causing the vaporized refrigerant supplied from the evaporator to react against the absorption solution from the rectifier and for circulating the absorption solution which has absorbed the refrigerant therein, through the generator. The evaporator is provided with heat exchanger pipes disposed vertically and refrigerant discharge nozzles discharging the liquefied refrigerant toward the inner wall of each of the heat exchanger pipes, with a nozzle being provided at a position displaced downward by a predetermined distance from the upper end of each of the heat exchanger pipes.

As a second feature of the present invention proposed to invention, achieve the above-described first object of the invention, there is provided an absorption refrigerator which comprises a generator provided with a heating portion for heating an absorption solution which has absorbed a heat exchange refrigerant and separating the refrigerant from the absorption solution by vaporization, a condenser for condensing and liquefying the separated vaporized refrigerant, an evaporator into which the liquefied refrigerant from the condenser is supplied and which is adapted to vaporize the refrigerant by heat exchange with a heat medium caused to be brought into contact with the outer surface thereof and an absorber for allowing the refrigerant to be absorbed in the absorption solution by causing the vaporized refrigerant supplied from the evaporator and the absorption solution from the generator to react with each other and for circulating the absorption solution, which has absorbed the refrigerant therein, through the generator. The evaporator is provided with heat exchanger pipes disposed vertically and refrigerant discharge nozzles each having a refrigerant discharge hole for discharging the liquefied refrigerant toward the inner wall of each of the heat exchanger pipes with the refrigerant discharge nozzle hole being provided at a position displaced downward by a predetermined distance from the upper end of each of the heat exchanger pipes and held opposite to the inner wall of the heat exchanger pipe leaving a space of about less than 5 mm from the latter.

Further, an absorption refrigerator according to a third feature of the present invention is so constructed that in order to achieve the above-described second object of the present invention, the refrigerant discharge nozzle in the apparatus according to the first feature is directly connected to one end of a U-shaped pipe projecting outwardly of the lower portion of each of the heat exchanger pipes and to the other end of the U-shaped pipe there is connected a refrigerant tank for storing the liquefied refrigerant supplied from the condenser in such a manner that the level of the refrigerant stored in the tank is held higher than each of the refrigerant discharge nozzles.

An absorption refrigerator according to a fourth feature of the present invention comprises a generator provided with a heating portion for heating an absorption solution which has absorbed a heat exchanging refrigerant so as to separate the refrigerant from the absorption solution, an evaporator for vaporizing the refrigerant by heat exchange with a heat medium caused to be brought into contact with the outer surface thereof, and an absorber for allowing the refrigerant to be absorbed in the absorption solution by causing the vaporized refrigerant supplied from the evaporator and the absorption solution supplied from the generator to react with each other and for circulating the absorption solution, which has absorbed the refrigerant therein, through the generator. The evaporator is provided with heat transfer pipes erected upright, and a number of heat transfer fins are attached to the outer surfaces of the heat exchanger pipes in spaced apart relationship with one another.

An absorption refrigerator according to a fifth feature of the present invention has the structure such that in the structure of the fourth feature of the invention, the angle of inclination of each of the heat exchanger fins with respect to the horizontal plane is set to an angular range of 15°–50°.

An absorption refrigerator according to a sixth feature of the present invention has a structure such that in the structure of the fourth feature of the invention, each of the heat exchanger fins is provided with a plurality of slits extending upward from the lower edge thereof in spaced apart relationship with one another along that lower edge.

An absorption refrigerator according to a seventh feature of the invention has the structure such that in the structure of the sixth feature, the slits formed with the heat exchanger fins are positioned so as to overlap vertically.

An absorption refrigerator according to an eighth feature of the present invention has the structure such that in the structure of the sixth feature of the invention, the edge portion@, forming the slits of the heat exchanger fins are bent to bulge downward.

BEST MODES FOR CARRYING OUT THE INVENTION

A preferred embodiment of the present invention will now be described with reference to FIGS. 1 through 5.

It is noted that throughout the description that follows, like parts are designated by like reference numerals with respect to FIGS. 7 through 9.

Figure 1:
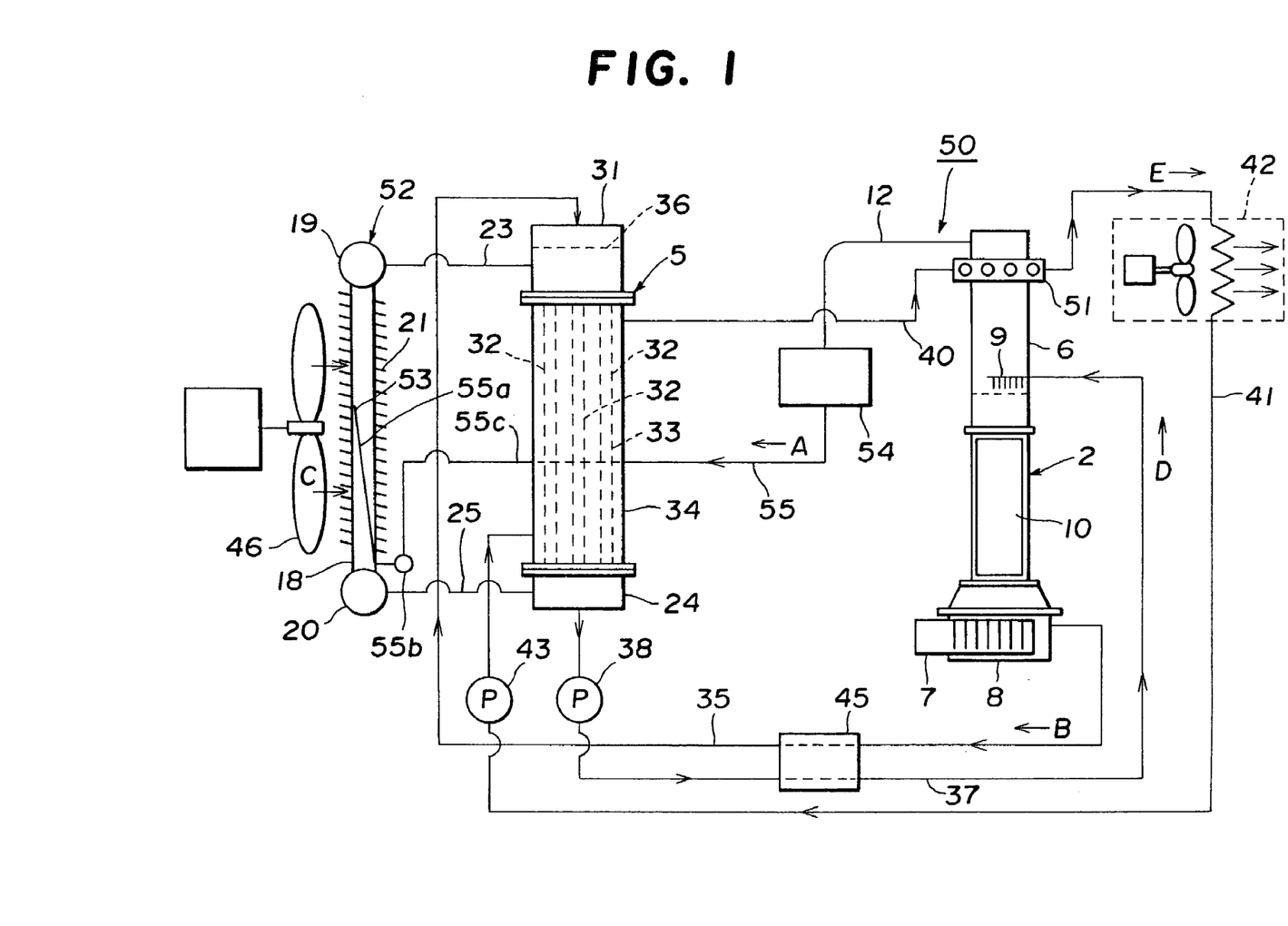
FIG. 1 is a block diagram of the entire system of the absorption refrigerator according to one mode of the present invention.

In FIG. 1, reference numeral 50 designates an absorption refrigerator according to this mode and comprises a generator 2 provided with a heating portion for separating the refrigerant from an absorption solution B (diluted absorption solution D) by vaporization, a condenser 51 for condensing and liquefying the separated vaporized refrigerant, an evaporator 52 into which the liquefied refrigerant A discharged from the condenser 51 is supplied and which is adapted to vaporize the liquefied refrigerant A through its heat exchange with the outside air C coming into contact with the outer surface thereof and an absorber 5 for allowing the absorption solution B to absorb the refrigerant A therein by causing the vaporized refrigerant A from the evaporator 52 to react against the absorption solution B from the generator 2 and for circulating the absorption solution B (i.e., the diluted absorption solution D), which has absorbed the refrigerant A therein, through the generator 2, wherein the evaporator 52 is provided with a plurality of heat exchanger pipes 18 erected upright and a plurality of refrigerant discharge nozzles 53 for discharging the liquefied refrigerant A toward the inner walls of the heat exchanger pipes 18, respectively, and each of the refrigerant discharge nozzles 53 is provided at a position displaced downward by a predetermined distance from the upper end of each of the heat exchanger pipes 18.

Figure 3:
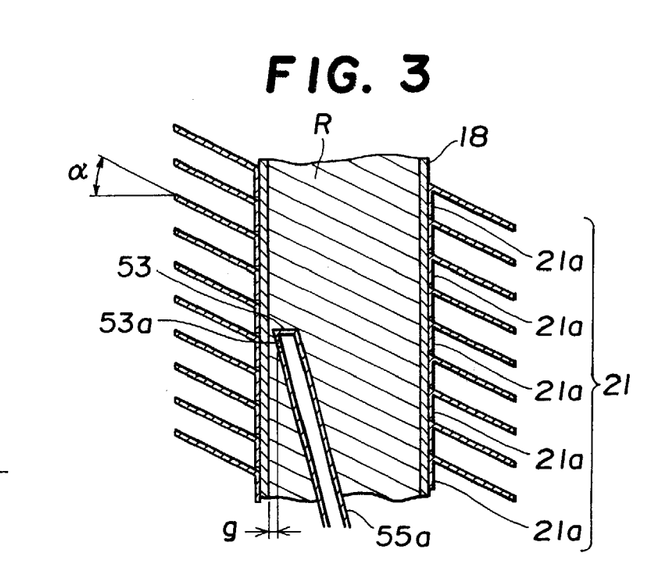
FIG. 3 is an enlarged vertical sectional view of a structure near a refrigerant discharge nozzle according to one mode of the present invention.

As shown in FIG. 3, the refrigerant discharge nozzle 53 is provided with a refrigerant discharge hole 53a for discharging the liquefied refrigerant A toward the inner wall of the heat exchanger pipe 18 at a position displaced downward by a predetermined distance from the upper end of the heat exchanger pipe 18 and is held in a spaced confronting relation with the inner wall surface of the heat exchanger pipe 18 leaving a gap (g) of less than about 5 mm from the latter.

Next, to describe the above-mentioned elements in more detail, in the instant mode, the condenser 51 is made to communicate with a cooling water path 33 of the absorber 5 and a cooling water circulation system is constructed with communication pipe 40 and a communication pipe 41 for establishing communication between the cooling water path 33 and the room unit 42.

Further, to the downstream side of the condenser 51, there is connected a refrigerant tank 54 for storing the refrigerant A which has been condensed and liquefied by the condenser 51, and a refrigerant flow-out portion of the refrigerant tank 54 is connected the refrigerant discharge nozzle 53 through a U-shaped pipe 55, which will be described presently.

The refrigerant discharge nozzle 53 is directly connected to one end of the U-shaped pipe 55 projecting from the lower portion of the heat exchanger pipe 18 and the refrigerant tank 54 is directly connected to the other end of the U-shaped pipe 55 so that the liquefied refrigerant A stored in the refrigerant tank 54 is supplied to the refrigerant discharge nozzle 53 through the U-shaped pipe 55 due to a siphon phenomenon.

Figure 2:
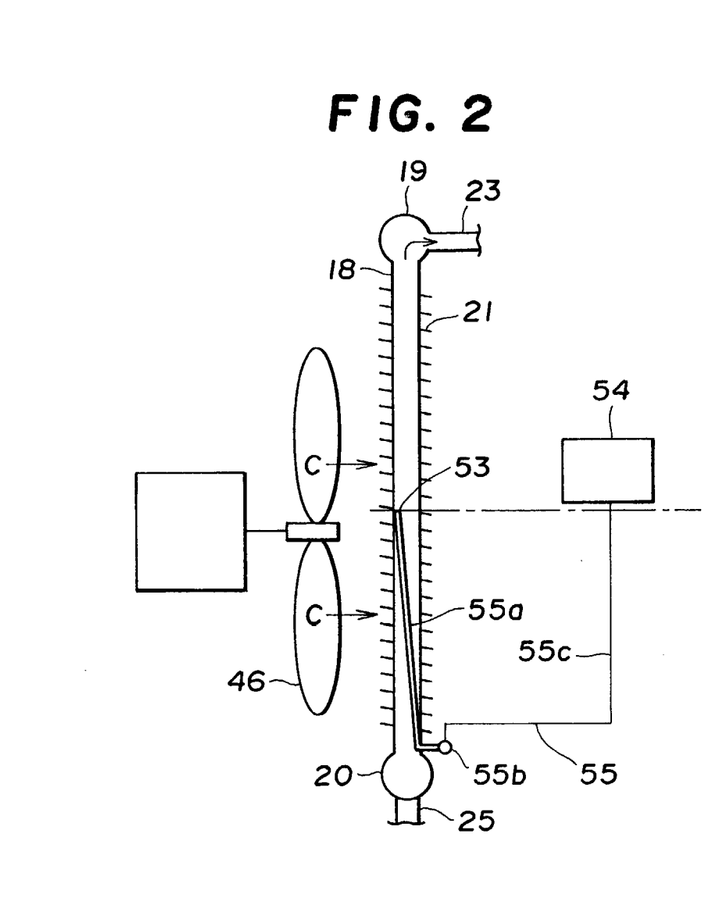
FIG. 2 is a schematic block diagram of an evaporator according to one mode of the present invention.

Further, a U-shaped pipe 55 is provided for each heat transfer pipe 18 and the above-mentioned refrigerant discharge nozzle 53 is integrally formed therewith. Further, it comprises a plurality of discharge pipes 55a projecting outside the heat exchanger pipes 18, a distribution header 55b for establishing communication among the discharge pipes 55a and a communication pipe 55c for establishing communication between the distribution header 55b and the refrigerant tank 54 and when viewed as a whole, it is in the shape of downwardly curved letter-U.

Further, as shown in FIG. 2, the refrigerant discharge nozzle 53 is located at a position displaced downward from the upper end of the heat exchanger pipe 18 by a predetermined distance (in the instant mode, at substantially the intermediate portion of the length of the heat exchanger pipe 18) and the lower end of the refrigerant tank 54 is positioned higher than the refrigerant discharge nozzle 53 so that the level of the liquefied refrigerant A stored therein is always kept at a position above the refrigerant discharge nozzle 53.

The reason why the refrigerant discharge nozzle 53 is provided at the position displaced downward from the upper end of the heat exchanger pipe 18 by a predetermined distance is that by causing the liquefied refrigerant A to be discharged toward the inner wall surface of substantially the intermediate portion of the length of the upright-erected heat exchanger pipe 18, even when the unvaporized liquid drop-like refrigerant A has been carried toward the upper portion of the heat exchanger pipe 18, that is, the downstream side, the liquid drop-like refrigerant A is stopped before it reaches the upper end of the heat exchanger pipe 18 and is caused to adhere to the inner wall of the heat exchanger pipe 18 so that in the course of its falling thereafter, the liquid drop-like refrigerant A is vaporized by its heat exchange with the outside air C through the wall of the heat exchanger pipe 18.

Such a phenomenon can be realized in such a manner liquefied that a main vaporization region for the liquefied refrigerant A is provided below the intermediate portion of the heat exchanger pipe 18 so that the amount of vaporization at the region above the intermediate portion is made small to thereby reduce the pressure within the heat exchanger pipe 18 and by this pressure reduction, the flow velocity of the air current within the heat exchanger pipe 18 is delayed.

Accordingly, the supply of the unvaporized refrigerant A into the absorber 5 is controlled to increase the amount of vaporization of the refrigerant A within the heat exchanger pipe 18.

Further, the reason why the refrigerant discharge nozzle 53 and the refrigerant tank 54 are connected through the U-shaped pipe and the refrigerant tank 54 is positioned higher than the refrigerant discharge nozzle 53 is that by so doing, the portion between both of the members (53, 54) is always kept in a liquid-sealed state and the influence of the variation of the pressure within the heat exchanger pipe 18 on the liquefied refrigerant A within the refrigerant tank 54 is controlled. The supply pressure of the refrigerant A with respect to each of the refrigerant discharge nozzles 53 provided for each of the heat exchanger pipes 18 is made constant by making it equal to the head pressure difference between the refrigerant discharge nozzle 53 and the refrigerant tank 54 so that by the synergistic action based on these arrangements, the amount of discharge of the refrigerant A from each of the nozzles 53 is made uniform especially in a state in which the refrigerant discharge current is small. By performing the supply of the refrigerant A based on the head pressure difference, the refrigerant circulation pump 44 which has hitherto been required (FIG. 7) can be omitted.

Figure 4:
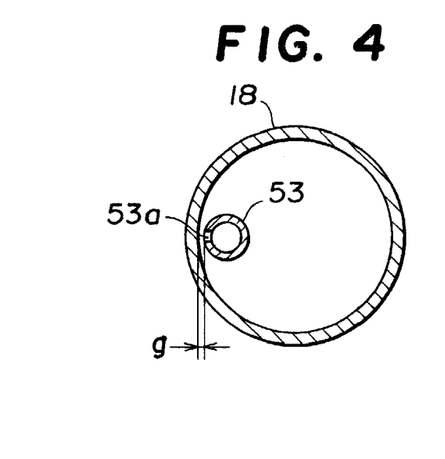
FIG. 4 is an enlarged cross-sectional view (partly omitted) showing the refrigerant discharge nozzle according to one mode of the present invention.

Further, as shown in FIGS. 3 and 4, on the side wall of the refrigerant discharge nozzle 53 near the top end thereof, there is formed refrigerant discharge hole 53a opening-toward the inner wall surface of the heat exchanger pipe 18. Since the top end of the nozzle 53 is provided adjacent to the inner wall surface of the heat exchanger pipe 18, the refrigerant discharge hole 53a is held opposite to the inner wall surface of the heat exchanger pipe 18 leaving a gap (g) of less than a predetermined distance therebetween.

The size of the gap (g) is dependent on the viscosity and temperature of the refrigerant being used but in the ordinary range of use, it is less than about 5 mm.

The reason why the gap g is less than about 5 mm is that when the liquefied refrigerant A is discharged toward the inner wall of the heat exchanger pipe 18 from the refrigerant discharge hole 53a, the liquefied refrigerant A is retained between the refrigerant discharge nozzle 53 and to its the inner wall of the heat exchanger pipe 18 due to its surface tension. Thereby for example, when a rising air current within the heat exchanger pipe 18 is large, the unvaporized refrigerant A is prevented from being sucked upward by making the surface tension maximum while when the rising air current is small, and the refrigerant A discharged from the refrigerant discharge hole 53a is prevented from falling along the outer surface of the refrigerant discharge pipe 53.

The liquefied refrigerant A falling along the outer surface of the refrigerant discharge pipe 53 is not made use of since it is never vaporized and it never deprives the outside air C of its latent heat of vaporization.

Further, as shown in FIG. 3, on the inner wall surface of the heat exchanger pipe 18 there is formed a helical groove R of a very fine depth (this may be knurling tool-like irregularities) over the entire inner wall surface of the heat exchanger pipe 18. Due to the capillary action of this helical groove R, the liquefied refrigerant A adheres to the inner wall surface of the heat exchanger pipe 18 in a favorable manner and, it expands along that inner wall surface with the result that smooth vaporization of the liquefied refrigerant A is performed.

On the other hand, as shown in FIGS. 2 and 3, the heat exchanger fins 21 mounted on the outer peripheral surface of the heat exchanger pipe 18 are provided in numbers at predetermined. intervals in the longitudinal direction of the heat exchanger pipe 18. Each of these heat exchanger fins 21 is arranged aslant with respect to the horizontal plane with the formation of a boss 21a which is brought into contact with the surface of the heat exchanger pipe 18. As shown in FIG. 3, the heat exchanger pipe 18 is inserted into the boss.

The angle of inclination of the heat exchanger fin 21 is so set that, as shown in FIG. 3, the downstream side of the direction of flow of the outside air C which is brought into contact with the surface of the heat exchanger pipe 18 is the lower side of the fin 21. Further, the boss 21a itself forms a heat transfer surface between the heat exchanger fin 21 and the heat exchanger pipe 18 and is brought into contact with the downwardly located heat exchanger fin 21 to thereby keep constant the space between the fins 21.

The reason why the heat exchanger fin 21 is inclined is that when the surface of the heat exchanger pipe 18 and that of the exchanger fin 21 are covered with condensation, depending on the temperature or humidity of the environment in which it is used, the resultant waterdrops are introduced toward the downstream side by the inclined heat exchanger fin 21 to cause them to fall down from the lower edge of the fin 21. Thus, the waterdrops are prevented from staying on the surface of the fin 21, the flow of the outside air C is prevented from being hindered and reduction of the heat exchange area of the heat exchanger fin 21 is prevented.

When the waterdrops are forced to stay on the heat exchanger fin 21, they begin to freeze depending on the condition of the outside air and the flow path of the outside air C formed among all the fins 21 is narrowed to further lower the heat exchange efficiency so that it is necessary to remove the waterdrops by causing them to fall down at an early stage.

Further, due to the inclination of the heat exchanger fin 21 with respect to the flow of the outside air C, the flow of the outside air C becomes turbulent on the side of the upper surface of the heat exchanger fin 21 near the upstream end of the fin as shown by X in FIG. 3, whereby the outside air C flowing on the surface of the fin 21 is agitated, thereby increasing the heat exchange efficiency between the heat exchanger fin 21 and the outside air C.

The angle $\alpha$ of inclination of the heat exchanger fin 21 is desired to be in the range of 15°–50°.

The reason why the angle $\alpha$ of inclination of the heat exchanger fin 21 is set to the above-mentioned range is that if the angle $\alpha$ is less than 15°, the adhesion of waterdrops to the heat exchanger fin 21 due to the surface tension of the water drops is strong so that the separation of the waterdrops from the surface of the fin 21 is not made smoothly, while if it exceeds 50°, the flow path of the outside air formed among all the heat exchanger fins 21 is narrowed due to the flow path being forced to curve rapidly, resulting in that ventilation of the evaporator 52 itself is spoiled to thereby lower the heat exchanger efficiency of the evaporator.

Figure 5:
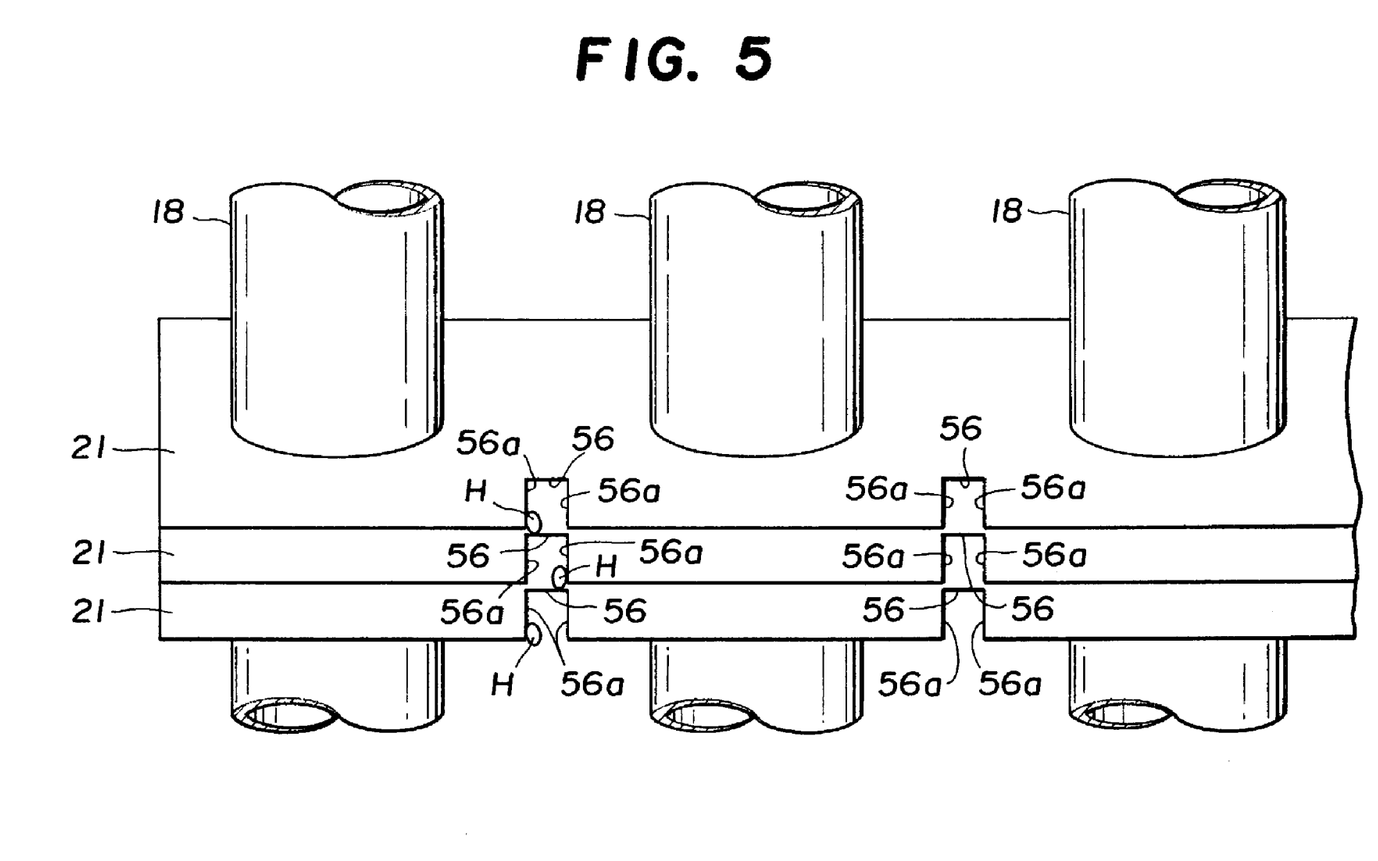
FIG. 5 is a front view of a portion of the external appearance of an evaporator according to one mode of the present invention.

In addition, in the instant mode, at a portion of the edge of each heat exchanger fin 21 located between every adjoining two heat exchanger pipes 18, there is formed a slit 56 of a predetermined depth from that edge of the fin 21 (FIG. 5).

This slit 56 is formed to have a depth of about 10 mm and a width of about 4 mm, for example. The reason why slit 56 is formed is that there are formed projecting edges at the points of intersection of both vertical side edges 56a of the slit 56 and the lower edge of the heat exchanger fin 21 and these projecting edges act as a trigger for breaking the adhesive power of waterdrops H of the refrigerant A based on the surface tension of the waterdrops so that the falling down of the waterdrops is accelerated.

Further, the slits 56 formed in the heat exchanger fins 21 are respectively made to overlap one another in the vertical direction so that a waterdrop H falling from any of the slits 56 of the upper heat exchanger fin 21 runs against another waterdrop H at the corresponding slit 56 of the lower heat exchanger fin 21 or joins together to grow in size to thereby accelerate the falling of the waterdrops.

Figure 6:
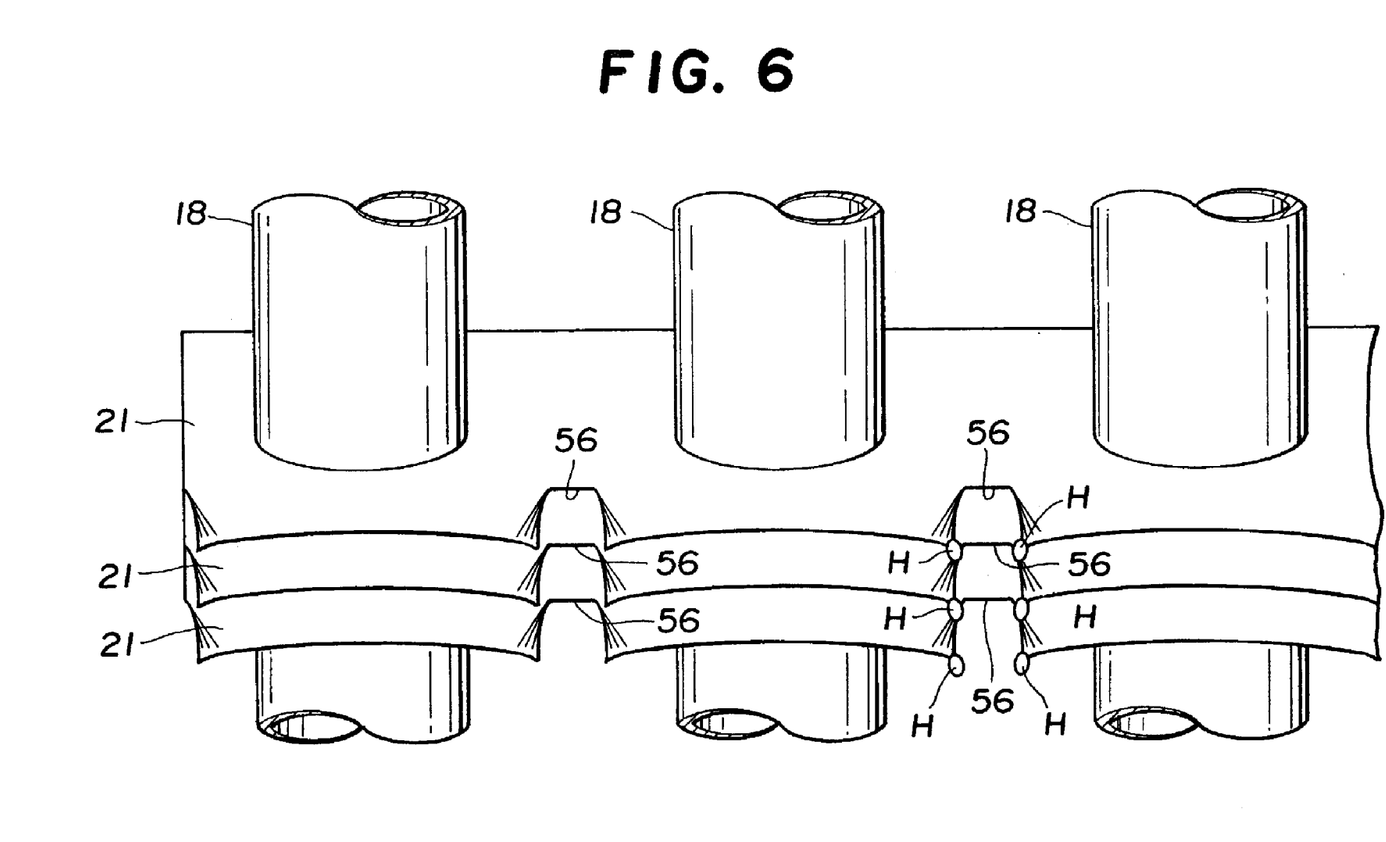
FIG. 6 is a schematic block diagram of a modification of the evaporator according to one mode of the present invention.

Still further, where the slits 56 are formed in each of the heat exchanger fins 21, since the lower edge of each heat exchanger fin 21 is divided into portions corresponding to the heat exchanger pipes 18, respectively, if the lower edges of these portions are curved downward to form curved surfaces at the slits 56 as shown in FIG. 6, it becomes possible to force the waterdrops H adhering to the surface of each heat exchanger fin 21 to roll down toward the slits 56 along the curved surfaces so that the falling of the waterdrops H is further accelerated.

In the case of the above-described absorption refrigerator 50, since the heat exchanger fins 21 are attached aslant to each of the heat exchanger pipes 18, when the surface of the heat exchanger pipe 18 or the surface of each of the heat exchanger fins 21 is covered with condensation, the resultant waterdrops H are introduced toward the downstream side due to the inclination of the fin 21 and then forced to fall down from the lower edge thereof.

Further, even when the waterdrops stay on the heat exchanger fin 21 without separating from the lower edge thereof due to surface tension, the waterdrops themselves gradually collect and grow to a mass whereupon such mass of waterdrops extends along the edge of the heat exchanger fin 21 to reach the edges of slits 56 and when it comes into contact with the projecting edge formed at the points of intersection of the vertical side edges 56a of the slit 56 and the heat exchanger fin 21, the balance of the surface tension of the waterdrop mass is lost and with this phenomenon acting as a trigger, a part of the waterdrop mass is separated from the heat exchanger fin 21.

Thus, when the balance of the surface tension of the waterdrop mass is lost at a part of the mass and the waterdrop mass begins to fall down, that part of the mass is also forced to fall down in sequence from the heat exchanger fin 21.

In the case of the absorption refrigerator so according to the instant mode, where the liquefied refrigerant A is vaporized to absorb heat from the outside air, since the liquefied refrigerant A is discharged toward the inner wall surface of substantially the intermediate portion of the length of the heat exchanger pipe 18 which is upright, even when the refrigerant A in the form of unvaporized liquid drops is carried upward, that is, the downstream side of the heat exchanger pipe 18, the amount of vaporization of the refrigerant A in the upper portion of the heat exchanger pipe 18 is small. Thus, the internal pressure is comparatively low so that the liquid drop-like refrigerant A stops moving upward before it reaches the upper end of the heat exchanger pipe 18, adheres to the inner wall of the pipe 18, begins to move down and in the course of its downward movement, is vaporized as a result of its heat exchange with the open air C through the wall of the pipe 18.

Consequently, the supply of the unvaporized refrigerant A to the absorber 5 is controlled to increase the amount of vaporization of the refrigerant A in the heat exchanger pipe 18 thereby enhancing the heat exchanger efficiency of the evaporator 52.

In addition, due to the fact that the above-mentioned refrigerant discharge hole 53a is held opposite to the inner wall of the heat exchanger pipe 18 leaving a gap g of less than about 5 mm, the liquefied refrigerant A discharged from the refrigerant discharge hole 53a is retained between the refrigerant discharge nozzle 53 and the inner wall surface of the heat exchanger pipe 18 by maximum surface tension. When the amount of the rising air current in the heat exchanger pipe 18 is large, the unvaporized refrigerant A is prevented from being sucked upward while when the amount of the rising air current is small, the refrigerant A discharged from that hole 53a is prevented from falling down along the outer surface of the refrigerant discharge pipe 53.

Accordingly, from this point of view, the amount of vaporization of the liquefied refrigerant A is secured to thereby increase the heat exchange efficiency of the evaporator 52.

At the same time, in the instant mode of the invention, due to the fact that the refrigerant discharge nozzle 53 and the refrigerant tank 54 for supplying the liquefied refrigerant A to the nozzle 53 are held in communication with each other through the U-shaped pipe 55 and the refrigerant tank 54 is positioned higher than the refrigerant discharge nozzle 53, the portion between the two elements is always liquid-sealed. Thus, the influence of the variation of pressure in the heat exchanger pipe 18 on the liquefied refrigerant A in the refrigerant tank 54 is controlled. Since the refrigerant supply pressure with respect to each of the refrigerant discharge nozzles 53 provided in correspondence to each of the heat exchanger pipes 18 is kept substantially constant based on the head pressure difference resulting from the difference of elevation between the nozzle 53 and the tank 54, the discharge amount of the refrigerant A from each of the discharge nozzles 53 is made uniform due to a synergistic action of these factors especially when the amount of discharge is not large.

Further, since the supply of the refrigerant A is based on the head pressure difference, the provision of the refrigerant circulation pump 44 (FIG. 7) which has hitherto been required is no longer necessary. This results in facilitating miniaturization and reduction of manufacturing costs.

Further, it should be noted that the various shapes and combinations of the composite members shown in the above-described mode are only an example and that various modifications based on design requirements are possible.

For example, although, in the above-described mode, an example is shown in which the refrigerant tank 54 is positioned higher than the refrigerant discharge nozzle 53 to save the use of the refrigerant circulation pump 44, it is also possible to arrange the refrigerant tank 54 below the refrigerant discharge nozzle 53 as usual and the refrigerant A is supplied to the nozzle 53 by refrigerant circulation pump 44.

In the above case, however, it is estimated that the supply of the refrigerant A becomes irregular due to pulsation of the refrigerant circulation pump 44 but the effect of increasing the amount of vaporization can be achieved to a sufficient degree by arrangement of the refrigerant discharge nozzle 53 at a position displaced downward from the upper end of each of the heat exchanger pipe 18.

As regards the position of installation of the refrigerant discharge nozzle 53 with respect to the heat exchanger pipe 18, it is not always limited to the intermediate portion of the length of the heat exchanger pipe 18 so that it is possible to adjust the position in the vertical direction based on the velocity of the air current in the heat exchanger pipe 18.

Further, although the structure is shown with each of the heat exchanger fins 21 inclined, the removal of waterdrops from the fin 21 may be facilitated by the provision of slits in horizontal fins.

Further, in the case of absorption refrigerator 50 according to the present invention, each of the heat exchanger fins 21 is attached aslant to each of the heat exchanger pipes 18 so that when the surface of the heat exchanger pipe 18 or the heat exchanger fin 21 is covered with condensation, the resultant waterdrops H are introduced toward the downstream side and then forced to fall down from the lower edge of the fin 21.

Consequently, waterdrops generated due to the above-mentioned condensation are prevented from staying on the surface of the heat exchanger fin 21 to thereby prevent such disadvantages as obstruction to the flow of the outside air C, the reduction of the heat exchange area of the heat exchanger fin 21 and the reduction of the area of the refrigerant flow path due to freezing of the waterdrops.

Still further, since the heat exchanger fin 21 is made inclined with respect to the flow of the heat medium, the flow of the outside air C along the surface of the heat exchanger fin 21 becomes turbulent so that the outside air C is agitated resulting in enhancing its heat exchange efficiency with the heat exchanger fin 21. Further, since the angle α of inclination of the heat exchanger fin 21 is set to the range of 15°–50°, the waterdrops are moved smoothly to secure their separation from the surface of the heat exchanger fin 21 and at the same time, heat exchange between the outside air C and the heat exchanger fin 21 is performed in a favorable manner.

Consequently, the lowering of the heat exchange efficiency of the evaporator 52 is prevented and the thermal efficiency of the absorption refrigerator as a whole is enhanced.

In the above-described mode, the shapes and combinations of component parts of the apparatus given therein are only shown as an example but various modifications may be made possible. For example, the refrigerant A may be discharged from the upper end of each heat exchanger pipe 18 as usual and the formation of slits 56 for each heat exchanger fin 21 may be omitted.

As described above, in the absorption refrigerator according to a first feature of the present invention, when the refrigerant is vaporized in the evaporator to absorb heat from the heat medium, even in a case where the liquefied refrigerant is discharged toward the inner wall surface of the heat exchanger pipe at a position displaced by a predetermined distance from the upper end of the heat exchanger pipe so that the unvaporized liquid drop-like refrigerant scatters toward the upper portion of the heat exchanger pipe due to the air current within the pipe, the refrigerant stops moving upward so as to adhere to the inner wall of the pipe before it reaches the upper end of the pipe and then begins to fall down in the course of which the refrigerant is vaporized as a result of its heat exchange with the heat medium through the wall of the pipe.

Accordingly, the unvaporized refrigerant is inhibited from being supplied to the absorber to increase the amount of vaporization of the refrigerant within the heat exchanger pipe which results in enhancing the heat exchange efficiency of the evaporator.

Moreover, according to a second feature of the present invention, the refrigerant discharge hole is held opposite to the inner wall surface of the heat exchanger pipe 18 leaving a gap g of about less than 5 mm from the latter so that the liquefied refrigerant discharged from the refrigerant discharge hole is retained between the refrigerant discharge nozzle and the inner wall surface of the heat exchanger pipe with the maximum surface tension. Thus, when the amount of the rising air current within the heat exchanger pipe is large, the liquefied refrigerant is prevented from being sucked upward while when small, the liquefied refrigerant discharged from the refrigerant discharge nozzle is prevented from falling down along the outer surface of the nozzle.

Accordingly, it is possible to secure the amount of vaporization by making the liquefied refrigerant adapted to the inner wall of the heat exchanger pipe to thereby enhance the heat exchange efficiency of the evaporator.

Further, in the absorption refrigerator according a third feature of the present invention, the refrigerant discharge nozzle and the refrigerant tank from which the liquefied refrigerant is supplied to the nozzle are made to communicate with each other through the U-shaped pipe and the and the refrigerant tank is positioned higher than the nozzle. Thus, the portion between both elements is always kept liquid-sealed with the refrigerant and the influence of the variation of the pressure in the heat exchanger pipe on the refrigerant in the U-shaped pipe is controlled. Further, the supply of the refrigerant to the refrigerant discharge nozzle is performed on the basis of the head pressure difference resulting from the difference of elevation between the nozzle and the refrigerant tank so that the refrigerant supply pressure is kept substantially constant. Due to a synergistic action of these arrangements, it is possible to make the discharge amount of the refrigerant from the refrigerant discharge nozzle as uniform as possible especially when the discharge amount is not large.

Still further, by supplying the refrigerant on the basis of the head pressure difference, the refrigerant circulation pump which has hitherto been required is no longer necessary and it is possible to make compact the apparatus and to reduce the manufacturing cost thereof.

In the absorption refrigerator according to a fourth feature of the present invention, each of the heat exchanger fins to be attached to the outer surfaces of heat exchanger pipes of the evaporator is inclined with respect to the flow of the heat medium with the downstream side of the fin being held lower than the upstream side thereof, so that even when waterdrops generating as a result of condensation adhere to the surface of the heat exchanger fin, such waterdrops can be moved to the lower portion of the fin to force them to fall down from the lower edge of the fin.

Consequently, the reduction of the heat transfer area of each of the heat exchanger fins due to the presence of the waterdrops and also the reduction of the width of the flow path of the heat medium between the heat exchanger fins can be prevented which results in preventing the lowering of the heat exchange efficiency of the evaporator.

According to a fifth feature of the present invention, the angle α of inclination of the heat exchanger fin 21 is set to the range of 15°–50° so that while controlling the increase of the resistance in the heat medium flow path, the smooth movement of the waterdrops on the heat exchanger fin is secured to thereby further increase the efficiency of heat exchange between the heat medium and the heat exchanger fin.

In the absorption refrigerator according to a sixth feature of the present invention, each of the heat exchanger fins to be attached to the outer surfaces of the heat exchanger pipes of the evaporator is inclined with respect to the flow of the heat medium with the downstream side of the fin being lower than the upstream side so that even when waterdrops generating as a result of condensation adhere to the surface of the heat exchanger fin, the waterdrops can be removed by allowing them to naturally move downward and to fall down from the lower edge of the fin.

Further, in the above case, even when the waterdrops stay at the lower edge of the heat exchanger fin due to their surface tension, they reach slits formed at the lower edge of the fins as they grow. At these slits, surface tension is lost by the presence of projecting edges formed at the points of intersection of the lower edge of the heat exchanger fin and the vertical side edges of the slits so that it is possible to remove the waterdrops without fail by forcing them to fall down.

Consequently, the reduction of the heat exchange area of the heat exchanger fin due to the presence of waterdrops and the reduction of the width of the flow path of the heat medium can be prevented thereby preventing the lowering of the heat exchange efficiency of the evaporator.

According to a seventh feature of the present invention, the slits of the heat exchanger fins are respectively overlapped in the vertical direction such that the waterdrops falling down from the slits of the uppermost heat exchanger fin are caused to run against those adhering to the slit portions of the lower heat exchanger fins in sequence or allowing the waterdrops to gather together to form a mass, thereby accelerating the removal of the lower waterdrops.

Lastly, according to an eighth feature of the present invention, the edges of the heat exchanger fins are bent upward among the slits, respectively, so that the waterdrops adhering to the heat exchanger fins are forced to move toward the slits thereby effectively performing waterdrop separating and removing operations through the slits.

What is claimed is:

1. An absorption refrigerator comprising:
   a generator including a heating portion for heating an absorption solution which has absorbed a heat exchange refrigerant and separating the refrigerant from the absorption solution by vaporization;
   a condenser for condensing and liquefying the separated vaporized refrigerant;
   an evaporator into which the liquefied refrigerant from said condenser is supplied and which is adapted to vaporize the refrigerant by heat exchange with a heat medium brought into contact with an outer surface thereof;
   an absorber for allowing the refrigerant to be absorbed in the absorption solution by causing the vaporized refrigerant supplied from said evaporator to react with the absorption solution from said generator and for circulating the absorption solution which has absorbed the refrigerant therein through said generator;
   said evaporator comprising vertical heat exchanger pipes and refrigerant discharge nozzles for discharging the liquefied refrigerant into respective said heat exchanger pipes; and
   each said discharge nozzle being located at a position displaced downwardly by a predetermined distance from an upper end of the respective said heat exchanger pipe and being inclined toward an inner wall of said respective heat exchanger pipe for discharging the liquefied refrigerant toward said inner wall with a top end of said nozzle adjacent to said inner wall.

2. An absorption refrigerator according to claim 1, wherein said evaporator comprises a plurality of upright heat transfer pipes, each having attached to an outer surface thereof a plurality of heat transfer fins spaced from each other.

3. An absorption refrigerator according to claim 2, wherein each of said fins is inclined at an angle of inclination with respect to the horizontal of from 15°–50°.

4. An absorption refrigerator according to claim 2, wherein each of said fins has extending upwardly from a lower edge thereof a plurality of slits spaced apart along said lower edge.

5. An absorption refrigerator according to claim 4, wherein said slits in said fins are positioned in vertically overlapping relation.

6. An absorption refrigerator according to claim 4, wherein edge portions of said fins defining said slits bulge downwardly.

7. An absorption refrigerator comprising:
   a generator including a heating portion for heating an absorption solution which has absorbed a heat exchange refrigerant and separating the refrigerant from the absorption solution by vaporization;
   a condenser for condensing and liquefying the separated vaporize d refrigerant;
   an evaporator into which the liquefied refrigerant from said condenser is supplied and which is adapted to vaporize the refrigerant by heat exchange with a heat medium brought into contact with an outer surface thereof;
   an absorber for allowing the refrigerant to be absorbed in the absorption solution by causing the vaporized refrigerant supplied from said evaporator and the absorption solution from said generator to react against each other and for circulating the absorption solution which has absorbed the refrigerant therein through said generator;
   said evaporator comprising vertical heat exchanger pipes and refrigerant discharge nozzles each having a refrigerant discharge hole for discharging the liquefied refrigerant toward inner walls of respective said heat exchanger pipes, each said refrigerant discharge nozzle hole being located at a position displaced downwardly by a predetermined distance from an upper end of each of the respective said heat exchanger pipe and opposite to said inner wall thereof with a space of about less than 5 mm therefrom.

8. An absorption refrigerator according to claim 7, wherein said evaporator comprises a plurality of upright heat transfer pipes, each having attached to an outer surface thereof a plurality of heat transfer fins spaced from each other.

9. An absorption refrigerator according to claim 8, wherein each of said fins is inclined at an angle of inclination with respect to the horizontal of from 15°–50°.

10. An absorption refrigerator according to claim 8, wherein each of said fins has extending upwardly from a lower edge thereof a plurality of slits spaced apart along said lower edge.

11. An absorption refrigerator according to claim 10, wherein said slits in said fins are positioned in vertically overlapping relation.

12. An absorption refrigerator according to claim 10, wherein edge portions of said fins defining said slits bulge downwardly.

13. An absorption refrigerator comprising:

a generator including a heating portion for heating an absorption solution which has absorbed a heat exchange refrigerant and separating the refrigerant from the absorption solution by vaporization;

a condenser for condensing and liquefying the separated vaporized refrigerant;

an evaporator into which the liquefied refrigerant from said condenser is supplied and which is adapted to vaporize the refrigerant by heat exchange with a heat medium brought into contact with an outer surface thereof;

an absorber for allowing the refrigerant to be absorbed in the absorption solution by causing the vaporized refrigerant supplied from said evaporator to react with the absorption solution from said generator and for circulating the absorption solution which has absorbed the refrigerant therein through said generator;

said evaporator comprising vertical heat exchanger pipes and refrigerant discharge nozzles for discharging the liquefied refrigerant into respective said heat exchanger pipes; and each said discharge nozzle being located at a position displaced downwardly by a predetermined distance from an upper end of the respective said heat exchanger pipe;

each said refrigerant discharge nozzle being directly connected to one end of a U-shaped pipe projecting outwardly of a lower portion of the respective said heat exchanger pipe; and an opposite end of said U-shaped pipe being connected to a refrigerant tank for storing the liquefied refrigerant supplied from said condenser in such a manner that the level of the refrigerant stored in said tank is higher than each of said refrigerant discharge nozzles.

14. An absorption refrigerator according to claim 13, wherein said evaporator comprises a plurality of upright heat transfer pipes, each having attached to an outer surface thereof a plurality of heat transfer fins spaced from each other.

15. An absorption refrigerator according to claim 14, wherein each of said fins is inclined at an angle of inclination with respect to the horizontal of from 15°–50°.

16. An absorption refrigerator according to claim 14, wherein each of said fins has extending upwardly from a lower edge thereof a plurality of slits spaced apart along said lower edge.

17. An absorption refrigerator according to claim 16, wherein said slits in said fins are positioned in vertically overlapping relation.

18. An absorption refrigerator according to claim 16, wherein edge portions of said fins defining said slits bulge downwardly.

* * * * *